United States Patent [19]

Michaud

[11] Patent Number: 4,684,138

[45] Date of Patent: Aug. 4, 1987

[54] CHUCK FOR USE IN DRIVING LAG RODS WITH A DRILL HAVING A REVERSIBLE MOTOR

[76] Inventor: James A. Michaud, 179 Marrett St., Westbrook, Me. 04092

[21] Appl. No.: 892,415

[22] Filed: Aug. 4, 1986

[51] Int. Cl.⁴ ........................ B23B 31/10; B25B 13/50

[52] U.S. Cl. ........................................ 279/7; 81/53.2

[58] Field of Search ........................... 279/7, 99–101; 81/53.2

[56] References Cited

U.S. PATENT DOCUMENTS

| | | | |
|---|---|---|---|
| 460,716 | 10/1891 | Ferguson | 279/7 |
| 540,989 | 6/1895 | Keyes | 279/7 |
| 1,566,691 | 12/1925 | Perry | 81/53.2 |
| 2,775,153 | 12/1956 | Parhaniemi | 81/53.2 |
| 2,800,820 | 7/1957 | Retterath | 81/53.2 |
| 3,239,233 | 3/1966 | Stillwagon, Jr. | 279/99 |
| 3,368,430 | 2/1968 | Levering | 81/53.2 |

*Primary Examiner*—Gil Weidenfeld
*Assistant Examiner*—Steven C. Bishop

[57] ABSTRACT

A chuck attachable to a drill powered by a reversible motor, is adapted for use in driving lag rods into wooden supports and has an axial bore extending therethrough which is partly threaded from one end to receive the machine-threaded end of a lag rod. A plug member is screwed into the threaded end of the bore of the chuck and has a formation enabling it to be so turned as to be seated at the inner end of the threads for engagement by the extremity of the machine threaded end of the lag rod. In order to so reduce the frictional engagement between the plug member and the extremity of the lag rod, the area of the engaged extremities is limited thus to ensure the release of the lag rod when the motor is reversed after the lag rod has been driven into the support to a desired extent.

5 Claims, 4 Drawing Figures

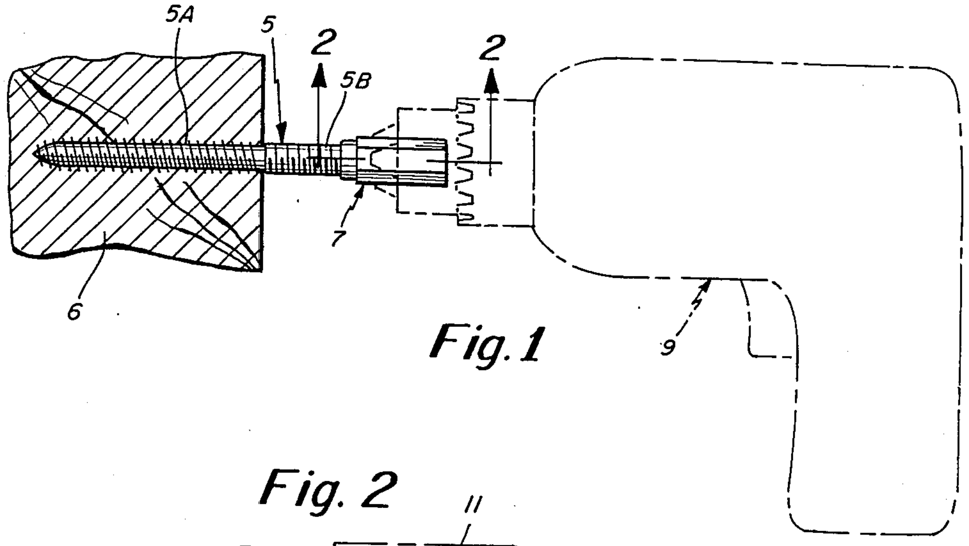
Fig. 1
Fig. 2
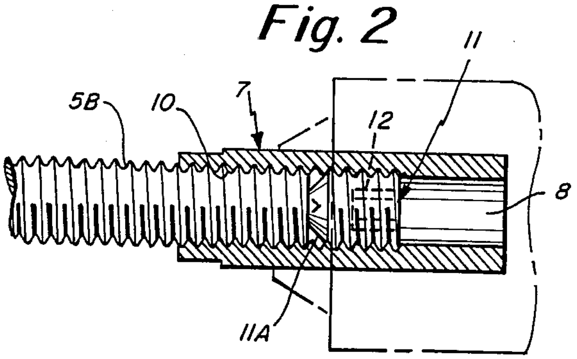
Fig. 3
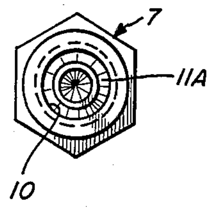
Fig. 4
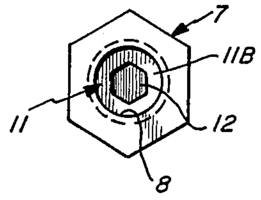

CHUCK FOR USE IN DRIVING LAG RODS WITH A DRILL HAVING A REVERSIBLE MOTOR

BACKGROUND OF THE INVENTION

The installation of supports by which pipes are hung commonly requires that lag rods be screwed into wooden supporting members.

Such lag rods have an end portion provided with machine threads to receive washer and nuts by which the pipe hangers are secured. In practice, in order to screw the lag rods into the wood, a pilot hole is drilled and then, with a nut threaded on the machine threaded end of the lag rod, the lag rod can be screwed into the wood via the pilot hole utilizing a wrench fitted on the nut to turn the lag rod.

It will be obvious that this portion of a pipe hanging operation is tedious and time consuming.

THE PRESENT INVENTION

The general objective of the present invention is to enable such lag rod placements to be easily and quickly effected and without the necessity of first drilling pilot holes.

In accordance with the invention This objective is attained by providing a chuck into which the machine threaded ends of lag rods can be screwed and which can be held by a drill powered by a reversible electric motor capable of driving the lag rod into the wood. An essential feature of the chuck is that, after a lag rod is driven into the wood to the wanted extent, reversal of the motor is attended by the immediate disengagement of the chuck from the lag rod.

To that end and more detail, each chuck in accordance with the invention has an axial bore extending from end to end thereof which is threaded part way through from one end to limit the extent to which a threaded plug member can be screwed therein. The plug is engaged by the end of the lag rod when threaded into the chuck. In order to ensure disengagement of the chuck from an installed lag rod, the area of contact between the plug member and the end of the lag rod in engagement therewith is less than the cross sectional area of the threaded bore of the chuck.

In practice and is preferred, the plug member has its end that is to be engaged by the end of the lag rod of reduced cross sectional area and its other end provided with a formation enabling it to be turned in either direction by a tool inserted through the other end of the bore of the chuck.

BRIEF DESCRIPTION OF THE DRAWINGS

The accompanying drawings illustrate a preferred embodiment of the invention of which FIG. 1 is a side elevation of a chuck in accordance with the invention connecting a lag rod to a drill;

FIG. 2 is a section, on a substantial increase in scale, taken approximately along the lines 2—2 of FIG. 1;

FIG. 3 is a view of the chuck as seen from the end thereof which receives the appropriate end of the lag rod; and FIG. 4 is a view of the opposite end of the chuck.

THE PREFERRED EMBODIMENT OF THE INVENTION

A typical lag rod is generally indicated at 5. Such a rod has an end 5A formed with threads of the wood screw type to enable the lag rod to be screwed into the wood, the beam 6, for one example. The other end 5B of the lag rod is formed with machine threads to enable a nut, not shown, to be threaded on it.

A chuck, generally indicated at 7 is hexagon in cross section and has a bore 8 extending from end to end thereof and is adapted to be conventionally secured to a hand held drill 9 of a type having a reversible motor, in practice a so-called one-half inch drill.

One end portion of the bore 8, hereinafter called the first end portion is threaded as at 10 in order to enable the lag rod end 5A to be threaded therein. A threaded plug 11 is screwed into the first end as far as it will go and is shown as having an end 11A of reduced cross sectional area exposed within the first end portion and an end 11B shown as provided with a socket 12 of the Allen type and accessible through the other end of the bore 8 by an Allen wrench thus to enable it to be turned in either direction. The length of the chuck 7 is not important other than providing a first portion such that the plug 11 may be seated within it with a sufficient threaded length left to enable the lag rod end 5B to be securely held while the lag rod is being driven into the beam 6. In practice, the plug member 11 is or may be a conventional set screw and the threaded portion 10 is about one inch in length.

With the chuck 7 attached to the drill 9 and the end 5B of a lag rod threaded into the first end portion of the chuck, the lag rod may be quickly and easily driven into the beam 6 to the wanted extent, typically without the necessity of first providing a pilot hole. Due to the relatively small area of contact between the plug 11 and the lag rod end 5B, the chuck 7 is immediately freed from the lag rod when the drill motor is reversed exposing the lag rod end 5B to enable a pipe hanger, for one example, to be secured thereto. Commonly, if a driven lag rod needs to be withdrawn, the plug is tightened against the end 5B thereof, and the drill motor operated in its reversed mode.

I claim:

1. A chuck for use in driving lag rods into wooden supports with a hand drill having a reversible motor, said lag rods of a type having an end portion having machine threads, said chuck having an axial bore extending therethrough to establish first and second end portions of the chuck, the bore of said first end portion threaded to receive said end portions of the lag rods and the bore of the second end portion unthreaded, and a plug member of substantially less length than said first end portion and threaded therein, said plug member having a formation at one end engageable by a tool inserted into the bore then to enable said plug member to be turned until seated at the inner end of the threaded end portion for engagement by the extremity of said end portion of a lag rod when threaded therein.

2. The chuck of claim 1 in which the end of the plug member having the formation is the end exposed through the unthreaded second end portion of the chuck.

3. The chuck of claim 2 in which an opposite end of the plug member is of a reduced cross sectional area thereby to limit frictional resistance to the release of a driven lag rod when the drill motor is reversed.

4. The chuck of claim 3 in which the plug member is a set screw.

5. The chuck of claim 4 in which the formation is a socket of the Allen type.

* * * * *